(12) United States Patent
Lewis et al.

(10) Patent No.: US 10,648,832 B2
(45) Date of Patent: May 12, 2020

(54) SYSTEM AND METHOD FOR IN-VEHICLE DISPLAY WITH INTEGRATED OBJECT DETECTION

(71) Applicant: Toyota Research Institute, Inc., Los Altos, CA (US)

(72) Inventors: Thor Lewis, Los Altos, CA (US); Ashlimarie Dong, San Francisco, CA (US); James Cazzoli, Mahopac, NY (US); Stephanie Paepcke, Mountain View, CA (US); Hiroshi Yasuda, San Francisco, CA (US); Christoffer Rodemeyer, New York, NY (US); Jemma Robinson, Brooklyn, NY (US); David Landa, Brooklyn, NY (US); James Veluya, Jersey City, NJ (US); Helena Zhang, Brooklyn, NY (US); Carlo Vega, Brooklyn, NY (US)

(73) Assignee: Toyota Research Institute, Inc., Los Altos, CA (US)

( * ) Notice: Subject to any disclaimer, the term of this patent is extended or adjusted under 35 U.S.C. 154(b) by 15 days.

(21) Appl. No.: 15/950,348

(22) Filed: Apr. 11, 2018

(65) Prior Publication Data
US 2019/0094040 A1   Mar. 28, 2019

Related U.S. Application Data

(60) Provisional application No. 62/563,845, filed on Sep. 27, 2017.

(51) Int. Cl.
*G06T 15/00* (2011.01)
*G01C 21/36* (2006.01)
(Continued)

(52) U.S. Cl.
CPC .......... *G01C 21/3697* (2013.01); *B60K 35/00* (2013.01); *B60Q 9/008* (2013.01);
(Continued)

(58) Field of Classification Search
USPC ....................................................... 345/419
See application file for complete search history.

(56) References Cited

U.S. PATENT DOCUMENTS

| 6,420,698 B1 | 7/2002 | Dimsdale |
| 8,344,894 B2 * | 1/2013 | Szczerba .............. B60K 28/066 340/435 |

(Continued)

*Primary Examiner* — Gordon G Liu
(74) *Attorney, Agent, or Firm* — Christopher G. Darrow; Darrow Mustafa PC (57) ABSTRACT

System, methods, and other embodiments described herein relate to improving situational awareness of occupants of a vehicle. In one embodiment, a method includes analyzing, using at least a processor of the vehicle, scan data from a sensor of the vehicle to detect at least one object within the surrounding environment. The method includes converting the scan data into converted data that represents the at least one object with a reduced quantity of data. The method includes rendering, using the converted data, at least one graphic that is a visual representation of the at least one object. The method includes displaying the at least one graphic within a display of the vehicle at a location within the display that represents a location of the at least one object relative to the vehicle in the surrounding environment.

20 Claims, 7 Drawing Sheets

(51) Int. Cl.
*G01S 17/93* (2020.01)
*B60Q 9/00* (2006.01)
*G06K 9/00* (2006.01)
*G06T 11/60* (2006.01)
*G06T 17/05* (2011.01)
*G01S 7/51* (2006.01)
*G01S 17/89* (2020.01)
*B60K 35/00* (2006.01)
*B60K 37/02* (2006.01)
*G06T 19/00* (2011.01)
*G05D 1/00* (2006.01)

(52) U.S. Cl.
CPC ............ *G01C 21/3602* (2013.01); *G01S 7/51* (2013.01); *G01S 17/89* (2013.01); *G01S 17/936* (2013.01); *G06K 9/00791* (2013.01); *G06K 9/00805* (2013.01); *G06T 11/60* (2013.01); *G06T 17/05* (2013.01); *B60K 37/02* (2013.01); *B60K 2370/152* (2019.05); *B60K 2370/179* (2019.05); *B60K 2370/193* (2019.05); *B60K 2370/21* (2019.05); *B60K 2370/48* (2019.05); *B60K 2370/52* (2019.05); *B60Y 2400/92* (2013.01); *G05D 1/0088* (2013.01); *G06T 19/006* (2013.01); *G06T 2200/08* (2013.01); *G06T 2210/36* (2013.01)

(56) References Cited

U.S. PATENT DOCUMENTS

| | | | |
|---|---|---|---|
| 9,013,286 | B2 | 4/2015 | Chen et al. |
| 9,488,492 | B2 | 11/2016 | Samarasekera et al. |
| 9,582,939 | B2 | 2/2017 | Zhang et al. |
| 9,633,483 | B1 | 4/2017 | Xu et al. |
| 9,715,761 | B2* | 7/2017 | Lee ................ G06T 17/10 |
| 9,767,598 | B2* | 9/2017 | Winder .............. G06T 15/04 |
| 2005/0174429 | A1* | 8/2005 | Yanai ................ B60R 1/00 348/148 |
| 2013/0257852 | A1 | 10/2013 | Meeker et al. |
| 2014/0198097 | A1 | 7/2014 | Evans |
| 2015/0232030 | A1 | 8/2015 | Bongwald |
| 2016/0266256 | A1 | 9/2016 | Allen et al. |
| 2017/0076160 | A1 | 3/2017 | Ohara |
| 2018/0039804 | A1* | 2/2018 | Ti ................ G06K 7/10386 |
| 2019/0079525 | A1* | 3/2019 | Towal .............. G05D 1/0055 |

* cited by examiner

SYSTEM AND METHOD FOR IN-VEHICLE DISPLAY WITH INTEGRATED OBJECT DETECTION

CROSS-REFERENCE TO RELATED APPLICATIONS

This application claims benefit of U.S. Provisional Application No. 62/563,845, filed on, Sep. 27, 2017, which is herein incorporated by reference in its entirety.

TECHNICAL FIELD

The subject matter described herein relates, in general, to a system and method for integrating detected objects into a navigation display and, more particularly, to repurposing point cloud data obtained from a LIDAR to generate graphics of detected objects and integrate the graphics within a navigation display.

BACKGROUND

Vehicles may be equipped with sensors that facilitate perceiving other vehicles, obstacles, pedestrians, and additional aspects of a surrounding environment. For example, a light detection and ranging (LIDAR) sensor uses light/lasers to scan the surrounding environment and detect a presence of objects in the surrounding environment. Knowledge of the objects may be used for many different tasks such as path planning, obstacle avoidance, and so on. Moreover, the vehicle may inform an operator about the presence of objects within the context of advanced driving assistance systems (ADAS) such as blind spot detection, rear cross traffic detection, and so on. However, the vehicle generally provides the noted indications through simple flashing lights, audible alarms, or other simplistic indicators that are not detailed representations. Moreover, the indicators generally provide notice of the presence of the objects and do not provide further information such as specific locations. Accordingly, operators may be left with an understanding of the surrounding environment that is partially complete.

SUMMARY

In one embodiment, example systems and methods relate to a manner of acquiring point data about an object and displaying information about the object in real-time within a display of a vehicle. Accordingly, the presently disclosed systems and methods are generally directed to displaying contextual information to occupants of a vehicle about objects in the surrounding environment to improve situational awareness of the occupants. Moreover, in one embodiment, the disclosed approach improves upon the efficiency of displaying point cloud data relating to the detected objects within a user interface of the vehicle by, for example, avoiding lag from transferring large quantities of data.

In one embodiment, an integrated display system controls a LIDAR sensor to scan a surrounding environment of the vehicle. The integrated display system analyzes sensor data obtained from the LIDAR sensor to identify objects and characteristics of the objects (e.g., object type, size, color, etc.) in the surrounding environment. The integrated display system can then segment and down-sample the sensor data for each object to provide a more efficient representation of the identified objects by reducing an overall size of the data that represents the identified objects. The integrated display system then, in one embodiment, communicates the converted point cloud data via a web socket to an interface or interface logic. The integrated display system then renders graphics from the converted point cloud data and displays the graphics at correlating locations relative to a representation of the vehicle within a display that includes, for example, a map (e.g., navigation map) of the surrounding environment. In this way, the integrated display system improves situational awareness of the occupants through displaying the additional information about the identified objects while also providing the information in an efficient manner such that the information can be provided in real-time without causing the display to lag.

In one embodiment, an integrated display system for improving situational awareness of occupants of a vehicle is disclosed. The integrated display system includes one or more processors and a memory communicably coupled to the one or more processors. The memory stores a monitoring module including instructions that when executed by the one or more processors cause the one or more processors to analyze, using at least a processor of the vehicle, scan data from a sensor of the vehicle to detect at least one object within the surrounding environment. The monitoring module includes instructions to convert the scan data into converted data that represents the at least one object with a reduced quantity of data. The memory stores an interface module including instructions that when executed by the one or more processors cause the one or more processors to render, using the converted data, at least one graphic that is a visual representation of the at least one object. The interface module includes instructions to display the at least one graphic within a display of the vehicle at a location within the display that represents a location of the at least one object relative to the vehicle in the surrounding environment.

In one embodiment, a non-transitory computer-readable medium for improving situational awareness of occupants of a vehicle and including instructions that when executed by one or more processors cause the one or more processors to perform one or more functions. The instructions include instructions to analyze, using at least a processor of the vehicle, scan data from a sensor of the vehicle to detect at least one object within the surrounding environment. The instructions include instructions to convert the scan data into converted data that represents the at least one object with a reduced quantity of data. The instructions include instructions to render, using the converted data, at least one graphic that is a visual representation of the at least one object. The instructions include instructions to display the at least one graphic within a display of the vehicle at a location within the display that represents a location of the at least one object relative to the vehicle in the surrounding environment.

In one embodiment, a method for improving situational awareness of occupants of a vehicle is disclosed. In one embodiment, a method includes analyzing, using at least a processor of the vehicle, scan data from a sensor of the vehicle to detect at least one object within the surrounding environment. The method includes converting the scan data into converted data that represents the at least one object with a reduced quantity of data. The method includes rendering, using the converted data, at least one graphic that is a visual representation of the at least one object. The method includes displaying the at least one graphic within a display of the vehicle at a location within the display that represents a location of the at least one object relative to the vehicle in the surrounding environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with detecting objects and displaying the objects within a display of a vehicle are disclosed. As mentioned previously, a LIDAR or other sensor may be integrated within a vehicle and used to perceive aspects of the surrounding environment. Moreover, perceptions of the sensors can be applied by various vehicle systems to generally inform an operator or other occupants about aspects of the surrounding environment. However, in general, the notifications/alerts are simply binary notifications that indicate, for example, a presence or absence of an object without providing additional detail.

Therefore, in one embodiment, an integrated display system provides a combined navigation and object detection user interface that provides visualizations within the navigation display of detected objects. In one embodiment, the integrated display system uses actual LIDAR point cloud data obtained from onboard LIDAR sensor(s) to render representations of the objects within the navigation display in locations that correlate with actual detected locations. In general, the integrated display system functions by providing a navigation display indicating a current position of the vehicle within a map of the surrounding environment. The navigation display may be from a top-down perspective, an elevated rear perspective of the vehicle, or another view that provides intuitive navigation information about a current route along with, for example, information about the surrounding environment (e.g., points of interest, road features, navigational indicators, objects, etc.).

Furthermore, as the integrated display system detects objects by analyzing point cloud data using one or more detection routines, the integrated display system, for example, down-samples the point cloud data for individual objects, and subsequently passes the down-sampled information into a user interface element via a web socket. The integrated display system can then render the down-sampled information into a graphical element representing the object that is displayed to occupants of the vehicle. The graphical element is, for example, a 3D model, a representative point cloud, or other visualization that is representative of the detected object. The integrated display system then provides the generated graphical element in an appropriate location within the display in order to indicate a relative location in relation to the vehicle along with a size and shape of the object.

The integrated display system acquires LIDAR point cloud data for detected objects and down-samples the data using a form of uniform down-sampling, semantic filtering, or another suitable down-sampling approach. For example, the uniform down-sampling includes skipping scan lines or skipping point samples in fixed intervals to reduce an overall quantity of data but still retaining a general form of the detected object. Alternatively, the semantic filtering includes filtering points using bounding boxes, convex hull volumes or other aspects from the object recognition algorithm to reduce points included in the converted/down-sampled data to a subset of points that convey the shape of the detected object while reducing an overall quantity of data. In one example, simply using points higher than a road surface also provides for a filtering that passes points from 3D objects while removing extraneous points from the sample.

Furthermore, in one example, the integrated display system converts the LIDAR data and additional characteristics of the object (e.g., trajectory information) into binary and an associated file format (e.g., JSON, XML, etc.) and then passes the binary and JSON file through a websocket server interface into a display module or other component.

The display module can then process the data using, for example, a JavaScript shader or other rendering mechanism and display the generated 3D graphic of the detected object within the NAV/MID display of the vehicle. Moreover, in one aspect, the display module uses an object model database or another repository to correlate pre-generated models with the detected objects and/or to apply textures or other visuals to the rendered object when presenting the graphic. In this way, the detected objects are efficiently displayed within a user interface of the navigation display while minimizing lag that may otherwise be experienced when processing large amounts of point cloud data. Additionally, the integrated display system provides an actual real-world representation of the detected object by using the point cloud data instead of a substitute graphic or reproduced camera image.

In further aspects, the integrated display system can leverage the point cloud data to produce alerts and animations of detected objects in order to provide situational awareness to the driver/occupant. As one example, when an obstacle is detected ahead of the vehicle using the LIDAR point cloud data, the integrated display system can render the object within the display and also render effects such as particular colors, a change in perspective (e.g., zoom), flashing elements, and/or other indicators to provide a sense of immediacy or danger. As a further example, when a hazard (e.g., predicted collision with a detected object) is detected, the integrated display system may render the hazard on the navigational display, and the view may change to a birds-eye view to provide a better perspective of the hazard. Furthermore, as the hazard becomes more immediate, the system can further adjust the view to emphasize the hazard, which is generated based, at least in part, on acquired LIDAR point cloud data of the hazard itself. In this way, the integrated display system not only improves situational awareness of the occupants but also improves the functioning of associated computing elements through the disclosed manner of acquiring and communicating the LIDAR point cloud data.

Figure 1:
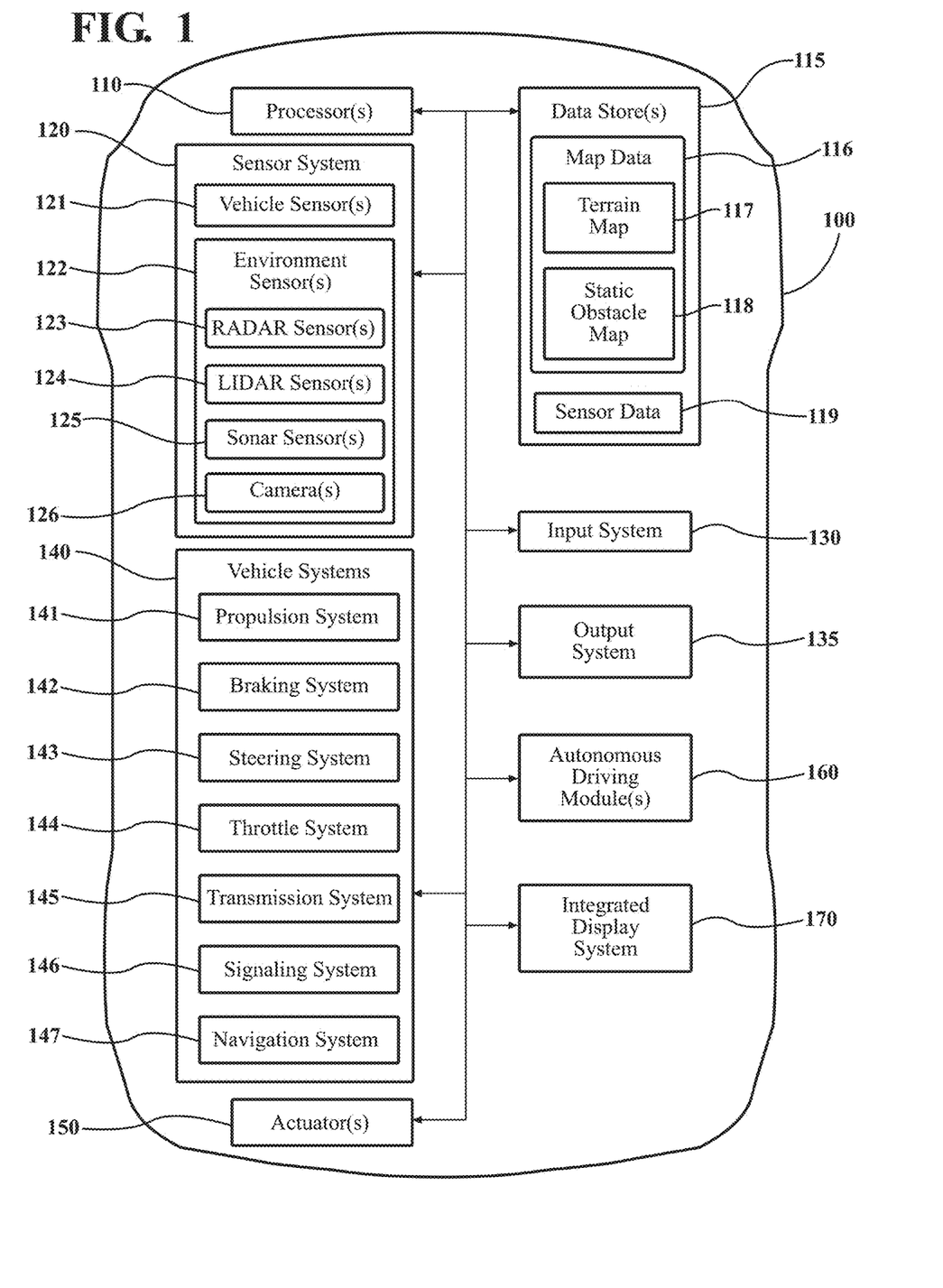
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can indicate contextual information to an operator/driver, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an integrated display system 170 that is implemented to perform methods and other functions as disclosed herein relating to integrating representations of detected objects within a display of the vehicle 100 such as a navigational display or other display that provides contextual information to occupants. The noted functions and methods will become more apparent with a further discussion of the figures.

Figure 2:
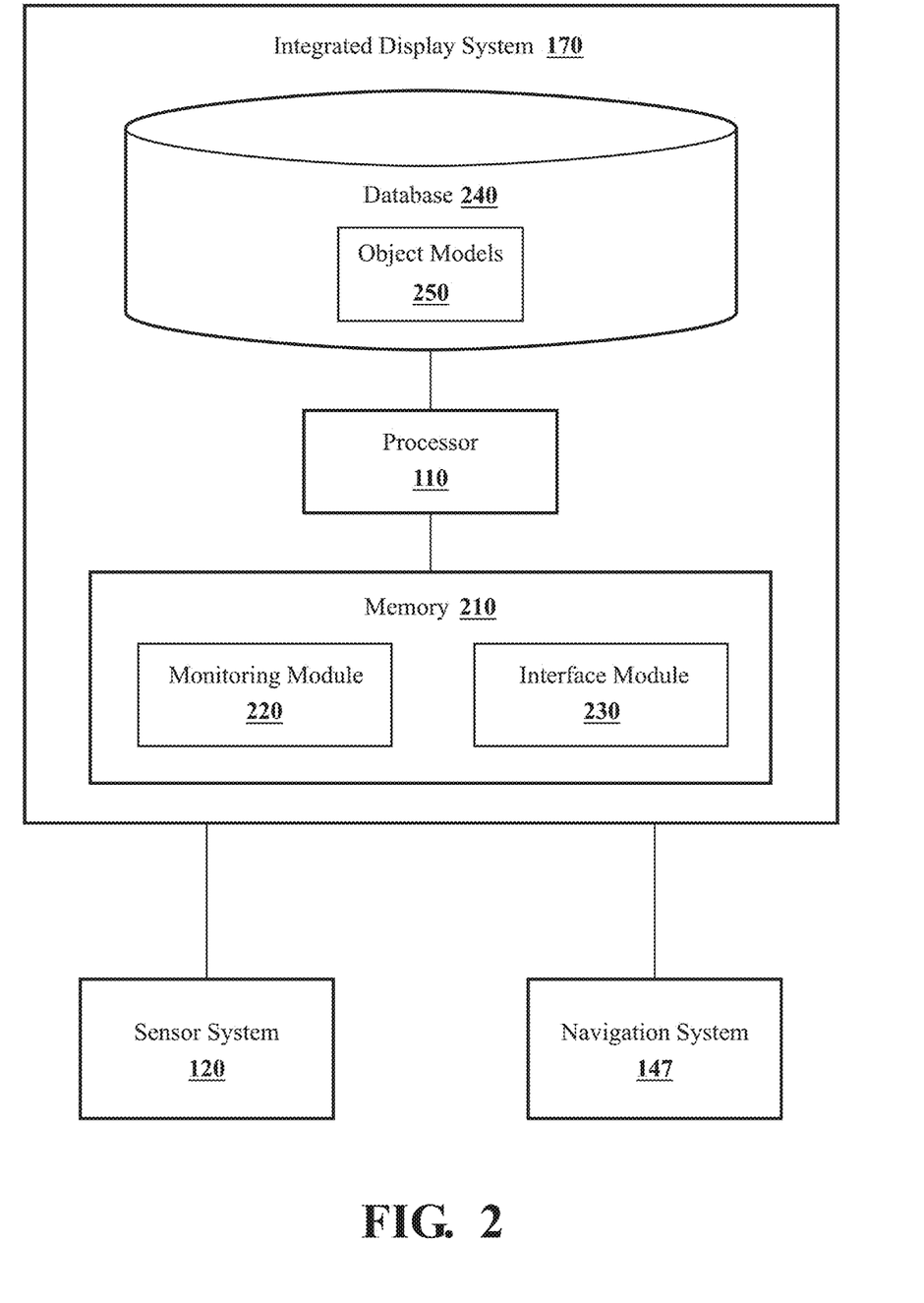
FIG. 2 illustrates one embodiment of an integrated display system that is associated with detecting objects and displaying the objects within a display of a vehicle.

With reference to FIG. 2, one embodiment of the integrated display system 170 of FIG. 1 is further illustrated. The integrated display system 170 is shown as including a processor 110 from the vehicle 100 of FIG. 1. Accordingly, the processor 110 may be a part of the integrated display system 170, the integrated display system 170 may include a separate processor from the processor 110 of the vehicle 100 or the integrated display system 170 may access the processor 110 through a data bus or another communication path. In one embodiment, the integrated display system 170 includes a memory 210 that stores a monitoring module 220 and an interface module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to receive data inputs from one or more sensors of the vehicle 100. The inputs are, in one embodiment, scan data that embody observations of one or more objects in a surrounding environment proximate to the vehicle 100 and/or other aspects about the surroundings. In general, as provided for herein, the monitoring module 220 receives sensor data from at least the LIDAR 124 in the form of point cloud data. However, the monitoring module 220, in various embodiments, may also receive additional sensor information about trajectories and further aspects of objects. In either case, in one embodiment, the monitoring module 220 controls the LIDAR sensor 124 to scan the surrounding environment and acquire the scan data about the surrounding environment including objects positioned therein.

Moreover, the monitoring module 220 applies, in one embodiment, object recognition functions to the scan data to distinguish between objects. For example, in one approach, the monitoring module 220 matches features of known objects with aspects of the scan data to detect the objects. In further aspects, the monitoring module 220 applies a machine learning algorithm (e.g., convolutional neural network (CNN)) or another object recognition technique to detect the object form the point cloud data.

Furthermore, in one embodiment, the integrated display system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes object models 250 along with, for example, scan data and/or other information that is used by the modules 220 and 230.

For example, the database 240 can include location coordinates (e.g., longitude and latitude), relative map coordinates or tile identifiers, time/date stamps from when the separate sensor data was generated, and so on. The scan data can include 3D point cloud data along with, for example, metadata describing additional characteristics (e.g., location) of the scan. Moreover, the object models 250 may include various data structures storing learned information about objects (e.g., vehicles, pedestrians, etc.) that is used to render visualizations of the objects. The object models 250 include, in one embodiment, information regarding poses, sizes, relative shapes of objects, textures, and so on. In one embodiment, the object models 250 are implemented as a lookup table that is referenced according to, for example, at least a type/class of a particular object as identified by the monitoring module 220. Additionally, in further embodiments, the database 240 and/or the memory 210 store the object models 250 in various portions.

In either case, the monitoring module 220, in one embodiment, segments the scan data associated with the detected object from an input stream of scan data, down-samples the point cloud data and, for example, converts the down-sampled data into a binary format while also aggregating additional information (e.g., trajectory data, location data, etc.) into a JSON file format. The monitoring module 220 can then communicate the down-sampled data along with the JSON file through a web socket or other mechanism into the interface module 230.

In one embodiment, the interface module 230 generally includes instructions that function to control the processor 110 to render visualizations of the detected objects from the converted data. The interface module 230 can then display the graphics at an indicated location within a navigation interface provided on a display of the vehicle. While a navigational display is discussed, of course, in other embodiments, the detected objects may be provided in a standalone display. Moreover, the navigational display may also include navigational elements such as a present route, direction information, satellite or cartographic imagery, a representation of the vehicle 100, and so on.

Figure 3:
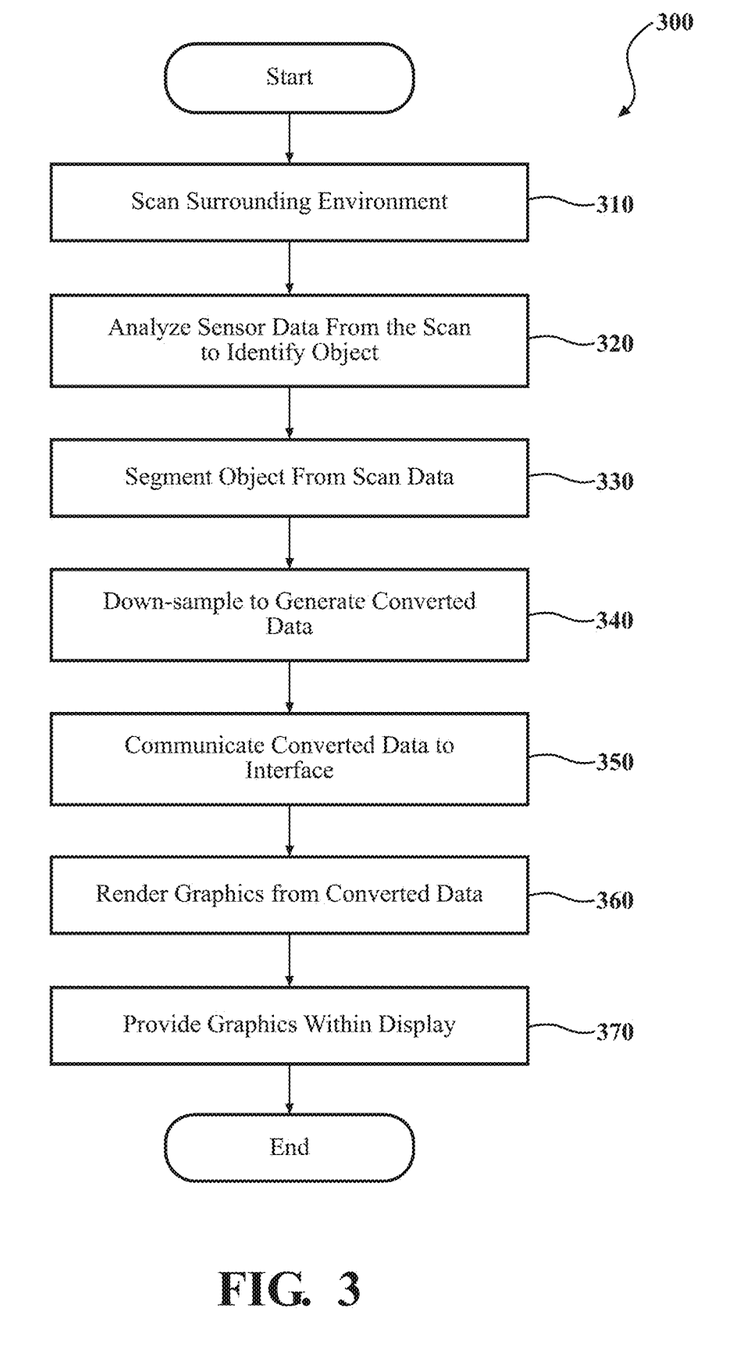
FIG. 3 illustrates one embodiment of a method associated with detecting objects and displaying the objects within a display of a vehicle.

Additional aspects of improving situational awareness of vehicle occupants through detecting and rendering objects within a display will be discussed in relation to FIG. 3. FIG. 3 illustrates a flowchart of a method 300 that is associated with detecting objects (e.g., vehicles, pedestrians, etc.) and displaying graphics of the objects within a display. Method 300 will be discussed from the perspective of the integrated display system 170 of FIGS. 1, and 2. While method 300 is discussed in combination with the integrated display system 170, it should be appreciated that the method 300 is not limited to being implemented within integrated display system 170, but is instead one example of a system that may implement the method 300.

At 310, the monitoring module 220 controls a sensor of the vehicle to scan the surrounding environment. In one embodiment, the monitoring module 220 controls the LIDAR sensor 124 to produce the scan data as a 3D point cloud representing the surrounding environment. In general, the monitoring module 220 controls the LIDAR sensor 124 to at least semi-continuously scan the surrounding environment and provide the scan data. Thus, the monitoring module 220, in one embodiment, iteratively executes the functions discussed at blocks 310-350. Furthermore, the monitoring module 220, in one embodiment, executes the noted functions in parallel for separate observations in order to maintain updated information within a pipeline.

At 320, the monitoring module 220 analyzes the scan data from a sensor of the vehicle to detect at least one object within the surrounding environment. In one embodiment, the monitoring module 220 analyzes the scan data as the scan data is received from the sensor in order to isolate objects from the scan data. That is, the monitoring module 220 processes the scan data according to an object recognition technique to distinguish the at least one object from the surrounding environment. Moreover, the monitoring module 220 can use the identification of the object and a class of the object as a way to select which objects are to be further processed for inclusion within the display of the vehicle 100. For example, in one embodiment, the monitoring module 220 detects objects from the scan data, classifies the objects according to a class/type (e.g., vehicle, pedestrian, etc.), and then tags or otherwise identifies whether the particular object is to be included within a nav interface of a display. The monitoring module 220 can discriminate between the detected objects according to a defined listing of types/classes of objects that should be included according to preferences of a driver/owner, a defined policy, pre-programming, and so on.

In further aspects, the monitoring module 220 communicates with, for example, an autonomous driving module 160 to receive information identifying which objects are of particular interest and thus should be included within the nav interface. For example, the monitoring module 220 receives identifications of objects with particular trajectories that may indicate possibilities of collisions with the vehicle 100, hazard notices, obstacle notices, and, more generally, indications about objects that are near the vehicle 100 and thus may affect navigation of the vehicle 100. In this way, the monitoring module 220 can dynamically determine which scan data to further process for inclusion within the nav interface as representations of associated detected objects.

At 330, the monitoring module 220 segments the converted data that represents the detected object from the scan data. Since objects are generally displayed independently within the nav interface, the associated scan data for each of the detected objects can be separately segmented from the initial scan data. In this way, the scan data associated with each object is initially distinguished from the other objects and aspects of the surrounding environment for additional processing.

At 340, the monitoring module 220 converts the scan data for the detected object by down-sampling the scan data into converted data. In one embodiment, the monitoring module 220 selectively filters portions of the scan data according to a point cloud filter. That is, for example, the point-cloud filter can include uniform down-sampling, semantic filtering, or another suitable down-sampling approach. By way of example, the uniform down-sampling includes skipping scan lines or skipping point samples in fixed intervals to reduce an overall quantity of data but still retaining a general form of the detected object such that the converted data remains a recognizable form of the detected object.

Alternatively, the semantic filtering includes filtering points using bounding boxes, convex hull volumes or other aspects from the object recognition algorithm to reduce points included in the converted/down-sampled data to a subset of points that convey the shape of the detected object while reducing an overall quantity of data. In general, the monitoring module 220 implements one or more filtering processes in order to reduce a volume of data associated with the detected object and thereby improve processing performance of the integrated display system 170. In this way, the integrated display system 170 improves an ability to efficiently process the scan data from the LIDAR sensor 124 and thereby produce visualizations within the display of the vehicle 100 about the detected objects.

At 350, the monitoring module 220 communicates the converted data to an interface for display within the vehicle 100. In one embodiment, the interface is the interface module 230 which is located separately from the monitoring module 220. That is, the monitoring module 220 and the interface module 230 are, in one embodiment, separated by a data bus or other communication pathway which can be a bottleneck when communicating large quantities of data such as the raw scan data. Thus, the monitoring module 220 converts the scan data into the converted data, as noted, and provides the converted data via a websocket communication interface or another communication mechanism to the interface module 230. In this way, the converted data about the detected object is efficiently communicated to the interface module 230.

As further explanation, briefly consider that the monitoring module 220 is embedded within the LIDAR sensor 124 or computing logic thereof in order to provide for quickly and efficiently processing the raw scan data produced by the LIDAR sensor 124. Accordingly, further consider that the interface module 230 is separately embedded within a display, the navigation system 147, an infotainment computing logic, or another component of the vehicle 100 which is in communication with but separate from the monitoring module 220. Thus, the monitoring module 220 uses the web socket interface to provide the converted data to the interface module 230 so that the interface module 230 can further process and display the converted data to occupants of the vehicle 100 without communicating large quantities of data embodied by the raw scan data.

As a further matter, in addition to providing the converted data about the shape and general form of the detected object, the monitoring module 220, in one embodiment, also provides metadata describing at least location information of the detected object relative to the vehicle 100. The interface module 230 generally uses this further information when locating the visualization of the object within the nav interface to provide contextual information about the object.

At 360, the interface module 230 renders, using the converted data, a graphic that is a visual representation of the detected object. The interface module 230 can render the graphic in several different ways. In general, the interface module 230 renders the graphic to be a representation of the actual detected object such that when provided within the display to the occupants, the graphic is, for example, recognizable as the associated detected object. Thus, in one embodiment, the interface module 230 renders the graphic by correlating the converted data with one of the object model 250. The object models 250 are defined/pre-generated graphics associated with different classes of objects. Thus, the object models 250, in one embodiment, are implemented using a lookup table or other data structure that correlates object classes with the separate models. Accordingly, the interface module 230 can use the identified class/pose/position/etc. of the detected object as an input to the lookup table and obtain a 3D model therefrom. This model is a 3D representation of objects within the noted class and thus generally resembles the detected object. In further aspects, the interface module 230 may further process the model by applying detected textures, colors, or other modifications to improve an association with the detected object.

Alternatively, in one embodiment, the interface module 230 renders the graphic from the converted data using a built-in rendering mechanism. For example, the interface module 230 implements a java shader or similar rendering mechanism to generate the graphic as a 3D model that appear similar in shape to the detected object. It should be appreciated that in various embodiments the rendering of the graphics used to display the detected objects can take many different forms including those described herein, combinations of the described approaches, and/or additional approaches not specifically outlined within this disclosure. In any case, the interface module 230 generally functions to produce the visual representations of the detected objects such that information about the objects can be conveyed via the noted display interfaces.

At 370, the interface module 230 displays the graphic within a display of the vehicle 100 and at a location within the display that represents a location of the object relative to the vehicle 100 in the surrounding environment. In one embodiment, the display is a center console display of the vehicle 100 or another electronic display/monitor that provides a navigation interface or other information to the occupants. In one embodiment, the navigation interface is a rendered view of the map location of the vehicle 100. Thus, the navigation interface can include additional graphics such as a representation of the vehicle, roads, buildings, points-of-interest, route information, aerial/satellite imagery, and other aspects that may be included within such an interface. Additionally, while a navigation interface is discussed, in further aspects, the noted graphics of detected objects may be provided separately within a standalone display, as an overlay to a display, as an augmented reality (AR) effect, or in another suitable form.

In either case, the interface module 230 provides the graphic of the detected object within the display at a location that correlates with an actual location of the detected object in relation to the vehicle 100. Thus, the graphic is provided with an orientation and position in relation to the vehicle 100 that correlates an actual orientation and position of the detected object. In this way, the integrated display system 170 provides information to occupants of the vehicle 100 about objects that are in the surrounding environment.

Moreover, in further aspects, the interface module 230 renders the graphics for the detected objects according to various configurations. For example, the interface module 230 can render the graphics and additional elements within the nav interface according to particular perspectives, angles, and so on. That is, the interface module 230 can render the nav interface with a following perspective from behind an animation of the vehicle 100, from a top-down view, a side-view, a front on view, and so on. In general, the interface module 230 adjusts the perspective/view according to particular contextual aspects such as a speed of the vehicle 100, detected hazards/obstacles, actions of the vehicle 100 (e.g., reversing), and so on. In either case, the graphics for the detected objects along with other aspects are generally displayed as 3D models to provide a realistic perspective of the surrounding environment in the display.

In further aspects, the interface module 230 renders and displays additional effects such as changes in perspective to highlight hazards, changes in colors/details/graphics to highlight objects, and so on. As a general matter, the interface module 230 can, for example, render various additional graphics in relation to the detected object in order to highlight hazards or potential hazards.

Figure 4:
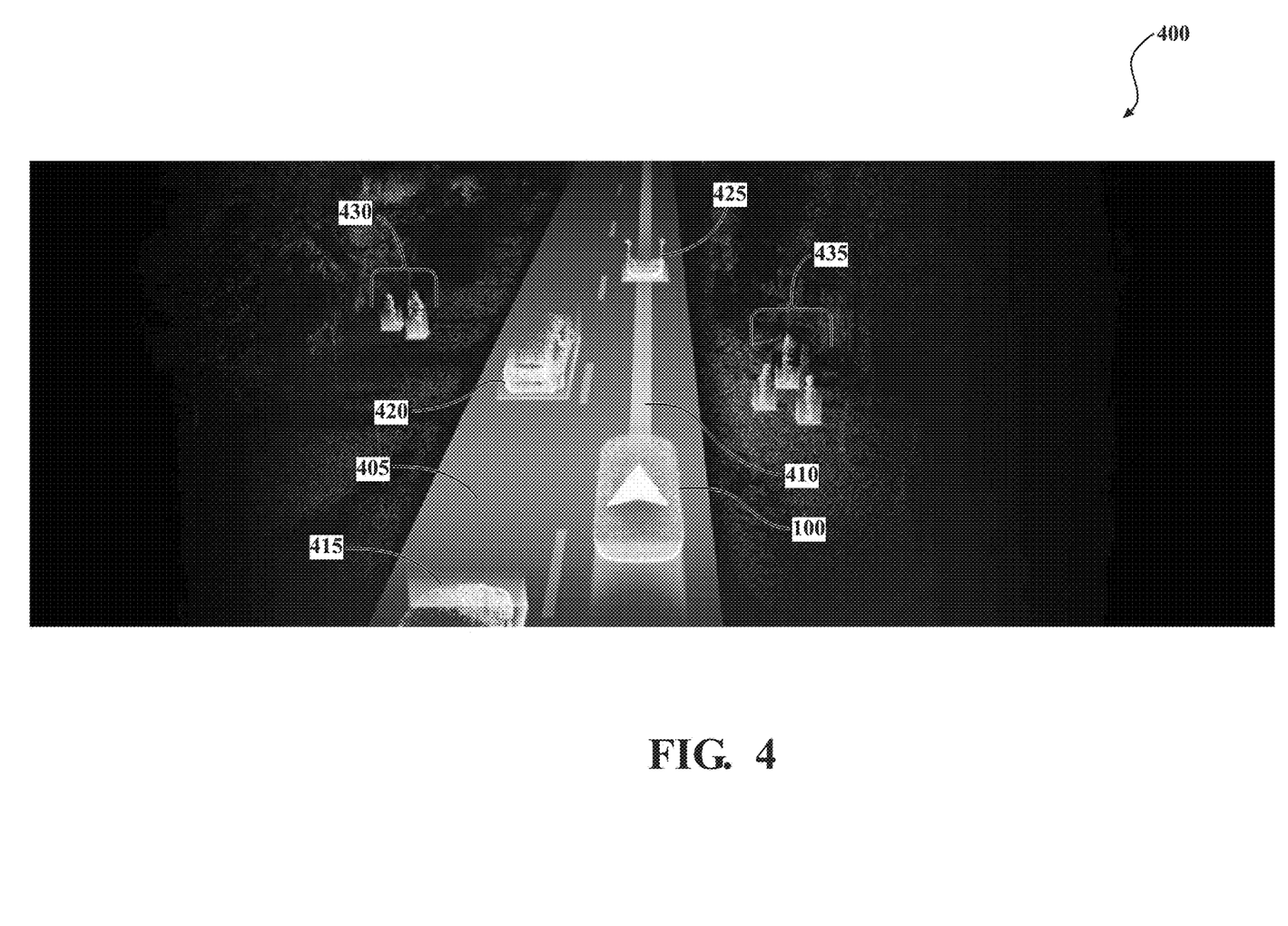
FIG. 4 illustrates one example of a display that includes a navigation interface with detected objects rendered therein.

Examples of the noted graphics and navigation interface will now be discussed in order to provide further context about how the disclosed system 170 functions. Accordingly, FIG. 4 illustrates an example interface as provided within a display of the vehicle 100 such as a NAV and/or MID display. The interface 400 is illustrated from a top-rear view of the vehicle 100, which is rendered as a general placeholder form. The interface 400 includes a graphical rendering of a roadway 405 on which the vehicle 100 is traveling along with a navigation path 410, which illustrates a path that the vehicle 100 is presently following. The interface 400 further includes several objects that have been detected and rendered by the integrated display system 170. For example, the interface 400 includes vehicles 415, 420, and 425 that are traveling on the roadway 405 with the vehicle 100. Additional objects illustrated in the interface 400 include groups of pedestrians 430 and 435 situated at an edge of the road 405. Additional aspects rendered by the integrated display system 170 within the interface 400 include highlight boxes around the objects 415-435 in addition to the 3D forms of the objects 415-435.

Figure 5:
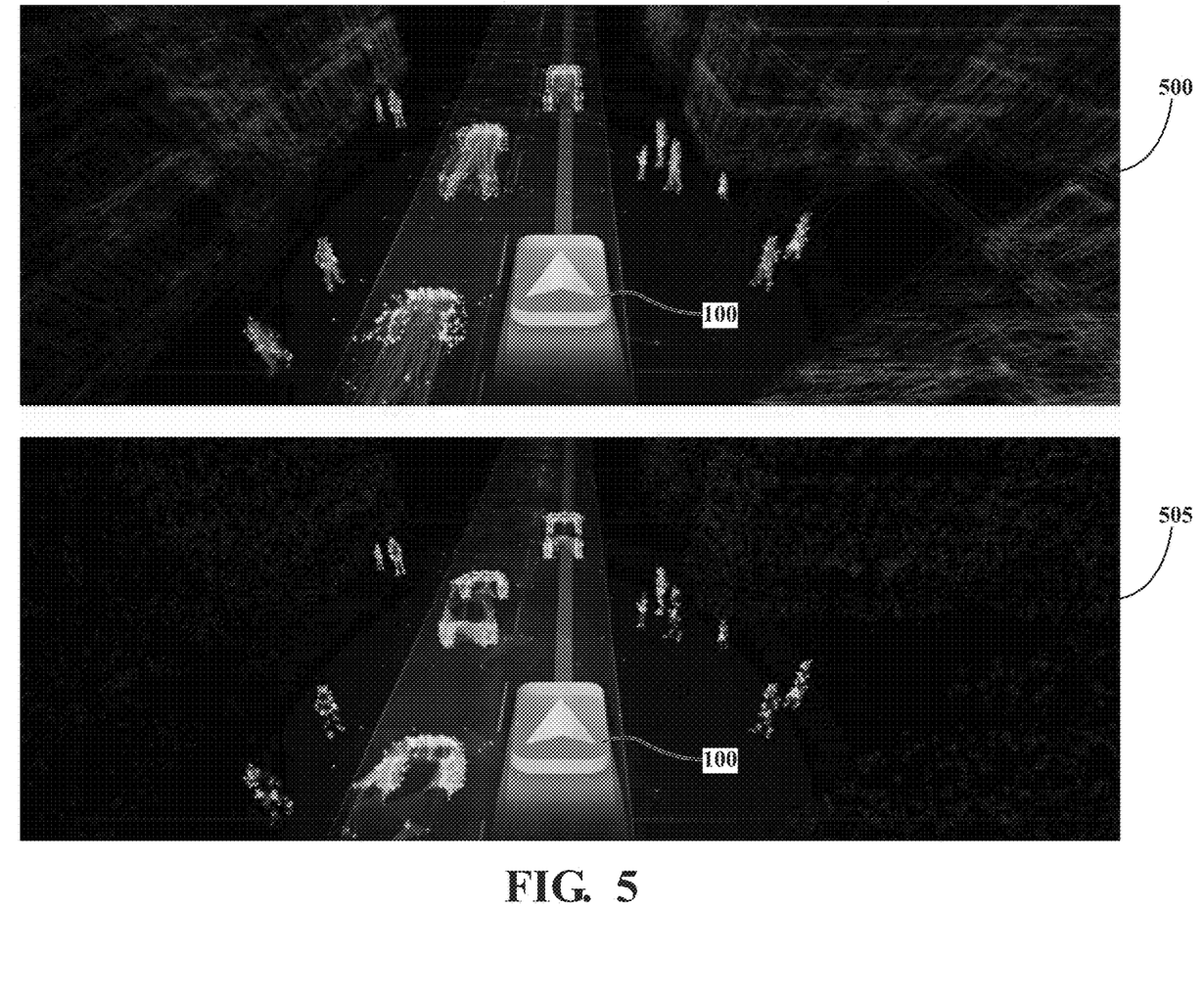
FIG. 5 illustrates further examples of displays that may be rendered by the disclosed systems and methods.

FIG. 5 illustrates additional examples of interfaces 500 and 505 with graphics of objects rendered in different styles. For example, the vehicle 100 in both of the interfaces 100 is rendered as a generic rectangular shaped volume with a navigation arrow indicating an approximate heading. The interfaces 500 and 505 further illustrate a same set of detected objects that are rendered according to styles with varying degrees of detail for the detected objects.

Figure 6:
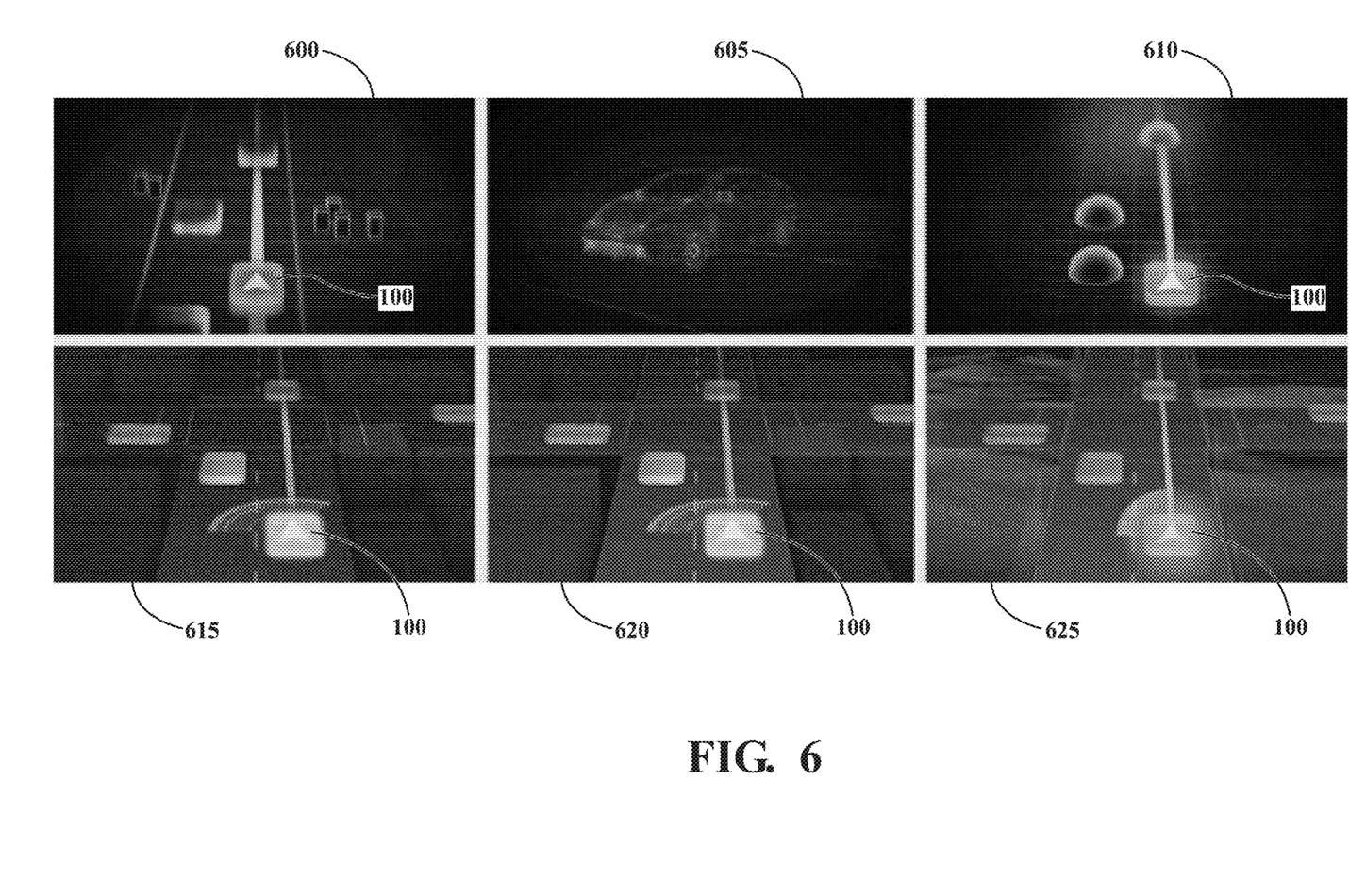
FIG. 6 illustrates additional styles of interfaces within displays that may be rendered by the disclosed systems and methods.

An additional example of the interface generated by the interface module 230 is illustrated in FIG. 6. FIG. 6 includes 6 separate interfaces 600, 605, 610, 615, 620, and 625 that are separately shown in different styles. The interface 605 illustrates how the interface module 230 can provide a zoomed-in view of different aspects. The interfaces 600, 610, 615, 620, and 625 all illustrate objects within the respective interfaces that are provided with less detailed graphics which are generally basic geometric features that can be color-coded by the interface module 230. Moreover, the interfaces 615, 620, and 625 illustrate additional graphics associated with a hazard indicator for a particular direction along with highlighting an object that represents a potential hazard.

Figure 7:
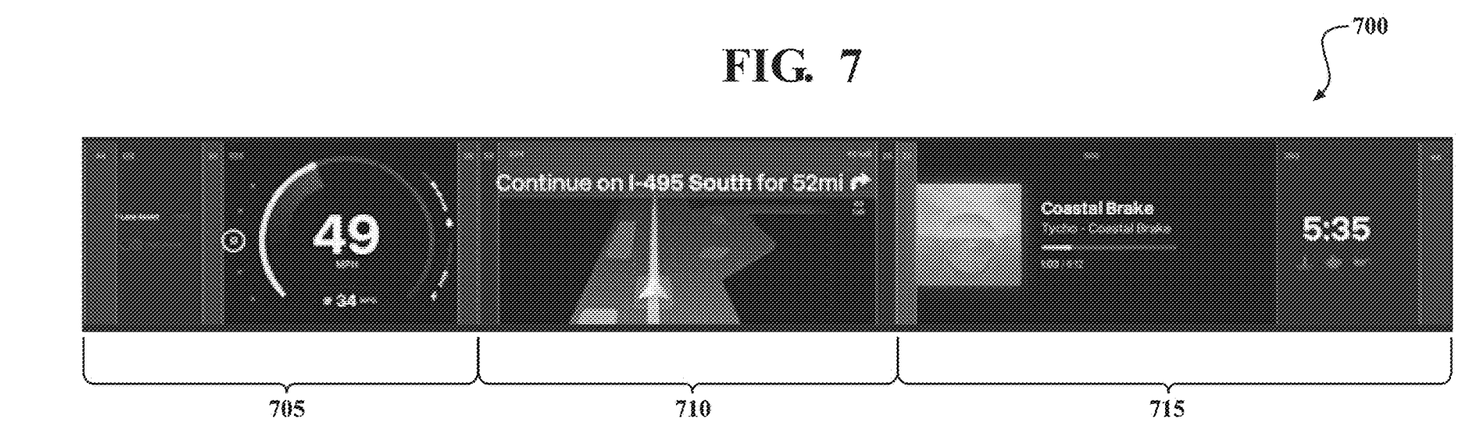
FIG. 7 illustrates an example in-dash display that includes a navigation interface as may be generated by systems and methods disclosed herein.

FIG. 7 illustrates an example of a MID display 700 that is provided within a center dash area of the vehicle 100. The display 700 is illustrated with three separate interfaces 705, 710, and 715. The interface 705 includes a graphic speedometer and additional driving context information. The interface 710 is a nav interface as previously discussed that includes directions, a present route, and graphics associated with nearby objects that have been detected and rendered by the integrated display system 170. The interface 715 is an infotainment interface providing information regarding music that is presently playing.

Figure 8:
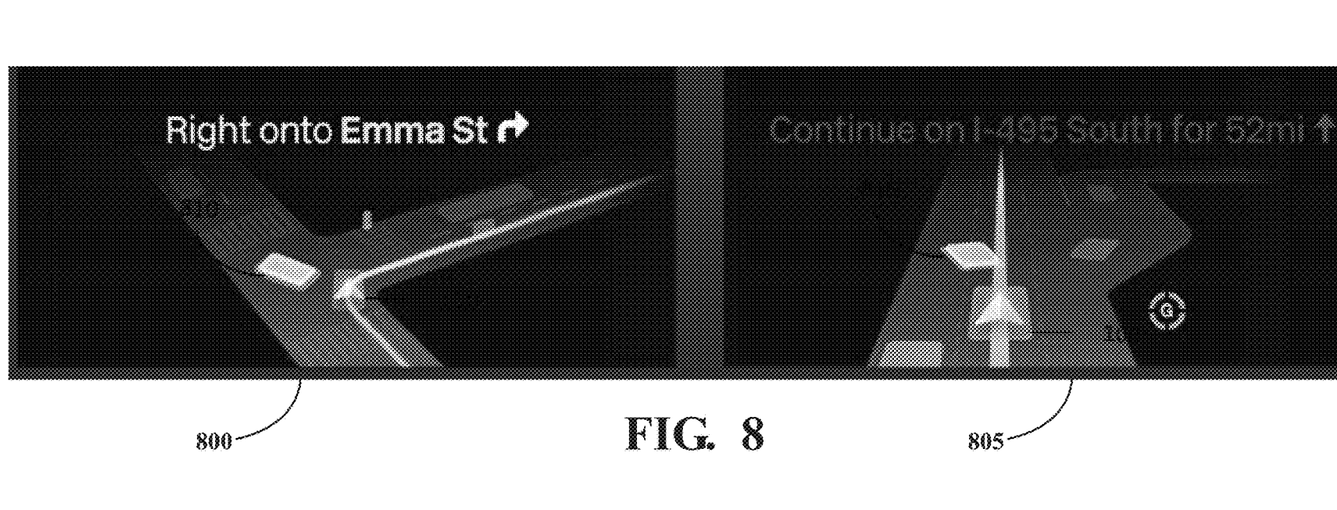
FIG. 8 illustrates further examples of navigation interfaces that may be generated by the disclosed systems and methods.

FIG. 8 illustrates two additional example interfaces 800 and 805 as may be produced by the interface module 230. In interface 800, a potential hazard 810 is rendered, where detected, and as turning into a path of the vehicle 100. Thus, the interface module 230 highlights the potential hazard/object 810 to emphasize the potential danger. Similarly, within interface 805, the interface module 230 highlights the object 815, which has veered into a path of the vehicle 100. In further aspects, the system 170 changes a perspective of a provided view, provides additional graphical animations, and/or provides additional indicators when hazards are detected in relation to the vehicle 100. Moreover, while the provided examples of hazards both relate to vehicles that are within a close proximity of the vehicle 100, additional hazards out to a perceivable range of the LIDAR sensor 124 and/or other sensors can be rendered within the interface. Thus, the system 170 can provide indications of hazards at a significant distance from the vehicle 100 for which the system 170 may zoom-in, highlight, change a perspective or perform other actions in order to ensure awareness of the noted hazards. In this way, the integrated display system 170 can improve situational awareness of an operator/occupants of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the integrated display system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the integrated display system 170, and/or the autonomous driving module(s) 160 may control some or all of these vehicle systems 140 and, thus, may be partially or fully autonomous.

The processor(s) 110, the integrated display system 170, and/or the autonomous driving module(s) 160 can be operatively connected to communicate with the various vehicle systems 140 and/or individual components thereof. For example, returning to FIG. 1, the processor(s) 110, the integrated display system 170, and/or the autonomous driving module(s) 160 can be in communication to send and/or receive information from the various vehicle systems 140 to control the movement, speed, maneuvering, heading, direction, etc. of the vehicle 100. The processor(s) 110, the integrated display system 170, and/or the autonomous driving module(s) 160 may control some or all of these vehicle systems 140.

The processor(s) 110, the integrated display system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the integrated display system 170, and/or the autonomous driving module(s) 160 can control the direction and/or speed of the vehicle 100. The processor(s) 110, the integrated display system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the integrated display system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the object models 250 as implemented by the interface module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An integrated display system for improving situational awareness of occupants of a vehicle, comprising:
one or more processors;
a memory communicably coupled to the one or more processors and storing:
a monitoring module including instructions that when executed by the one or more processors cause the one or more processors to analyze, using at least a processor of the vehicle, scan data from a sensor of the vehicle to detect at least one object within a surrounding environment, wherein the scan data is a point cloud and the sensor is a light detection and ranging (LiDAR) sensor,
wherein the monitoring module includes instructions to convert the scan data into converted data that represents the at least one object with a reduced quantity of data by applying a point cloud filter to the scan data to generate the converted data; and
an interface module including instructions that when executed by the one or more processors cause the one or more processors to render, using the converted data, at least one graphic that is a visual representation of the at least one object,
wherein the interface module includes instructions to display the at least one graphic within a display of the vehicle at a location within the display that represents a location of the at least one object relative to the vehicle in the surrounding environment including instructions to provide the at least one graphic as a visualization within a navigation interface in the display that is a virtual representation of the surrounding environment without acquiring an image of the surrounding environment.

2. The integrated display system of claim 1, wherein the monitoring module includes instructions to convert the scan data including instructions to down-sample the scan data into the converted data by selectively filtering portions of the scan data according to the point cloud filter.

3. The integrated display system of claim 1, wherein the monitoring module includes instructions to convert the scan data including instructions to:
segment the converted data that represents the at least one object from the scan data, and
communicate, using a websocket communication interface, the converted data and metadata describing at least location information of the at least one object to an interface for display within the vehicle.

4. The integrated display system of claim 1, wherein the interface module includes instructions to render the at least one graphic including instructions to correlate the converted data with an object model of the at least one object that is a defined graphic of a class of the at least one object.

5. The integrated display system of claim 1, wherein the interface module includes instructions to render the at least one graphic including instructions to generate the at least one graphic from the converted data to appear as a three-dimensional model that is similar in shape to the at least one detected object.

6. The integrated display system of claim 1, wherein the interface module includes instructions to display the at least one graphic including instructions to provide the at least one graphic within the display at a display location that corresponds to a real-world location of the at least one object in relation to the vehicle and in real-time as the sensor acquires the scan data.

7. The integrated display system of claim 1, wherein the monitoring module includes instructions to control the sensor of the vehicle to scan the surrounding environment and produce the scan data representing the surrounding environment, and wherein the monitoring module includes instructions to analyze the scan data including instructions to process the scan data according to an object recognition technique to distinguish the at least one object from the surrounding environment.

8. The integrated display system of claim 1, wherein the vehicle is operating at least semi-autonomously.

9. A non-transitory computer-readable medium for improving situational awareness of occupants of a vehicle and including instructions that when executed by one or more processors cause the one or more processors to:
analyze, using at least a processor of the vehicle, scan data from a sensor of the vehicle to detect at least one object within a surrounding environment, wherein the scan data is a point cloud acquired from a light detection and ranging (LiDAR) sensor;
convert the scan data into converted data that represents the at least one object with a reduced quantity of data by applying a point cloud filter to the scan data to generate the converted data;
render, using the converted data, at least one graphic that is a visual representation of the at least one object; and
display the at least one graphic within a display of the vehicle at a location within the display that represents a location of the at least one object relative to the vehicle in the surrounding environment, wherein the instructions to display include instructions to provide the at least one graphic as a visualization within a navigation interface in the display that is a virtual representation of the surrounding environment without acquiring an image of the surrounding environment.

10. The non-transitory computer-readable medium of claim 9, wherein the instructions to convert the scan data include instructions to down-sample the scan data into the converted data by selectively filtering portions of the scan data according to the point cloud filter, and
wherein the instructions to convert the scan data include instructions to communicate, using a websocket communication interface, the converted data and metadata describing at least location information of the at least one object to an interface for display within the vehicle.

11. The non-transitory computer-readable medium of claim 9, wherein the instructions to render the at least one graphic include instructions to correlate the converted data with an object model of the at least one object that is a defined graphic of a class of the at least one object.

12. The non-transitory computer-readable medium of claim 9, wherein the instructions to render the at least one graphic include instructions to generate the at least one graphic from the converted data to appear as a three-dimensional model that is similar in shape to the at least one detected object.

13. The non-transitory computer-readable medium of claim 9, wherein the instructions to display the at least one graphic include instructions to provide the at least one graphic within the display at a display location that corresponds to a real-world location of the at least one object in relation to the vehicle and in real-time as the sensor acquires the scan data.

14. A method of improving situational awareness of occupants of a vehicle, comprising:
analyzing, using at least a processor of the vehicle, scan data from a sensor of the vehicle to detect at least one object within a surrounding environment, wherein the scan data is a point cloud acquired from a light detection and ranging (LiDAR) sensor;
converting the scan data into converted data that represents the at least one object with a reduced quantity of data by applying a point cloud filter to the scan data to generate the converted data;
rendering, using the converted data, at least one graphic that is a visual representation of the at least one object; and
displaying the at least one graphic within a display of the vehicle at a location within the display that represents a location of the at least one object relative to the vehicle in the surrounding environment including providing the at least one graphic as a visualization within a navigation interface in the display that is a virtual representation of the surrounding environment without acquiring an image of the surrounding environment.

15. The method of claim 14, wherein converting the scan data includes down-sampling the scan data into the converted data by selectively filtering portions of the scan data according to the point cloud filter.

16. The method of claim 14, wherein converting the scan data includes:
segmenting the converted data that represents the at least one object from the scan data, and
communicating, using a websocket communication interface, the converted data and metadata describing at least location information of the at least one object to an interface for display within the vehicle.

17. The method of claim 14, wherein rendering the at least one graphic includes correlating the converted data with an object model of the at least one object that is a defined graphic of a class of the at least one object.

18. The method of claim 14, wherein rendering the at least one graphic includes generating the at least one graphic from the converted data to appear as a three-dimensional model that is similar in shape to the at least one detected object.

19. The method of claim 14, wherein displaying the at least one graphic includes providing the at least one graphic within the display at a display location that corresponds to a real-world location of the at least one object in relation to the vehicle and in real-time as the sensor acquires the scan data.

20. The method of claim 14, further comprising:
controlling the sensor of the vehicle to scan the surrounding environment and produce the scan data representing the surrounding environment, wherein analyzing the scan data includes processing the scan data according to an object recognition technique to distinguish the at least one object from the surrounding environment.

* * * * *